May 11, 1943.  R. J. WOODS  2,318,909
WING CONSTRUCTION
Filed Oct. 2, 1940  2 Sheets-Sheet 1
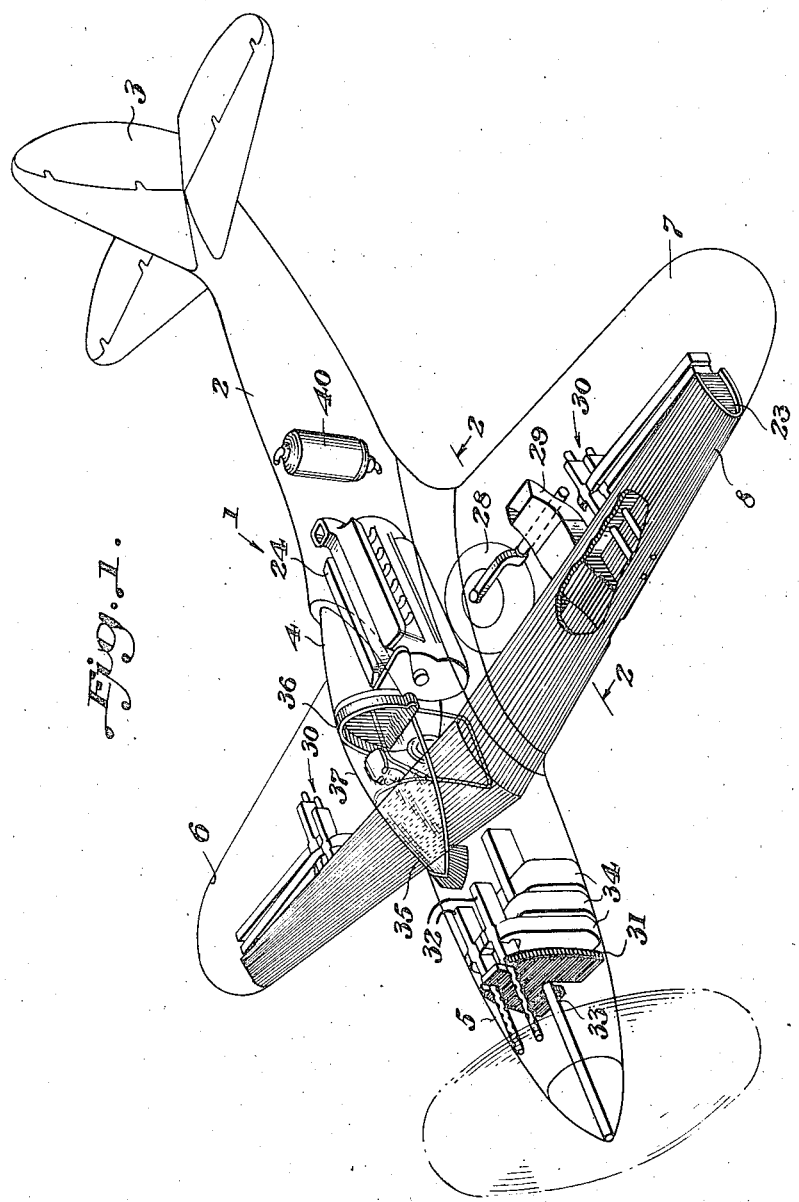

May 11, 1943.   R. J. WOODS   2,318,909
WING CONSTRUCTION
Filed Oct. 2, 1940   2 Sheets-Sheet 2
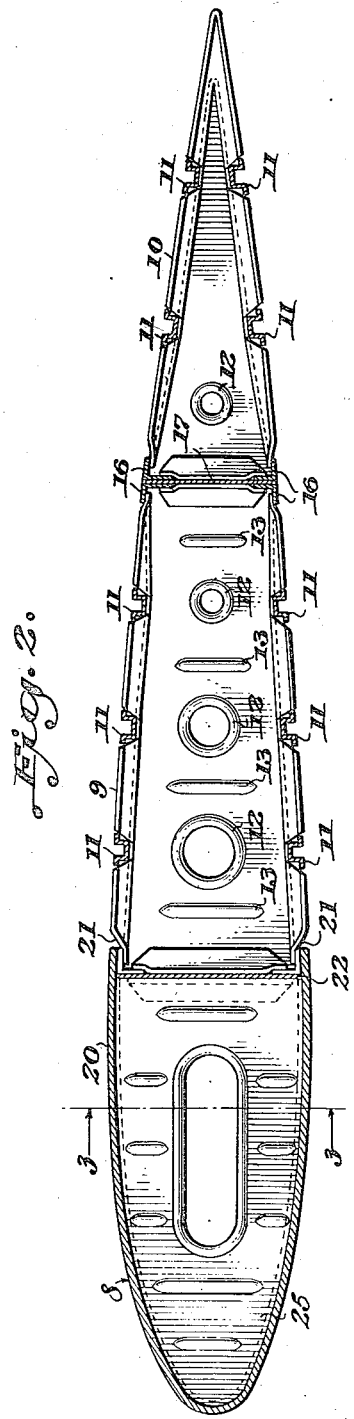
Inventor:
Robert J. Woods.
Semmes, Keegin Beale & Semmes
By   attys.

Patented May 11, 1943

2,318,909

UNITED STATES PATENT OFFICE 2,318,909

WING CONSTRUCTION

Robert J. Woods, Grand Island, N. Y., assignor to Bell Aircraft Corporation, Buffalo, N. Y., a corporation of New York Application October 2, 1940, Serial No. 359,427

5 Claims. (Cl. 244—117)

This invention relates generally to airplane wing construction, and more especially to a wing beam composed of armor metal.

One of the objects of this invention is to provide a wing beam which also serves as a protection to other vital parts of the airplane.

A further object of this invention is to provide a wing beam composed of armor metal which also serves as a fuel tank.

With these and other objects in view, this invention embraces the concept of providing a wing structure for an airplane in which the wing beam is so constructed that it serves as a protecting shield for other vital parts of the airplane in addition to serving as a supporting structure. Moreover, the beam, if of box construction, can also be used as a fuel tank.

In the drawings:

Figure 1 discloses a side elevational view of an airplane partly in section.

Figure 2 is a cross-sectional view taken along line 2—2 of Figure 1, looking in the direction of the arrows.

Figure 3 is a cross-sectional view taken along line 3—3 of Figure 2, looking in the direction of the arrows.

For purposes of illustration, the invention is shown in the drawings as adapted for use in connection with a high speed monoplane, generally designated by the numeral 1. This airplane 1 comprises a fuselage 2 provided with an empennage 3, a cockpit 4, a prolonged nose portion 5, and wings having high speed characteristics 6 and 7 supported by a wing beam of box structure 8.

The wings 6 and 7, as best shown in Figure 2, are supported by the box beam 8, a series of intermediate wing ribs 9 and a series of trailing edge wing ribs 10. These series of wing ribs 9 and 10 are of airfoil section and their edges are notched to carry connecting stringers 11. They are also provided with cutaway portions 12 and stiffeners 13 and are attached by means of angles 16 to the shear member 17 which forms the rear beam.

The box beam 8 consists of a curved member 20 of airfoil section, the extremities of which fit into recesses in the intermediate series of wing ribs 9 as indicated at 21 to form a smooth surface on which to support the outer skin of the airfoil, which is of conventional design.

A shear piece 22 which extends the length of the box beam 8 serves both as a closure for the open rear portion of the curved member 20 and as a front beam for the airfoil. The ends of the curved member 20 are closed by solid bulkheads as indicated at 23 in Figure 1 so as to form the box beam 8 into a tank suitable for fuel.

The curved member 20, shear member 22 and bulkheads 23 are composed of armor plate, thereby providing a beam which not only supports the wings 6 and 7 but also provides a bullet-proof fuel tank which may be operatively connected to the motor of conventional design 24 by any suitable means. In order to prevent motion of fluid in the tank, bulkheads 25 which are perforated so as to be able to act as surge plates are also provided as best shown in Figures 2 and 3. These bulkheads 25 are composed of ordinary metal.

In addition to serving as a protection for the fuel supply and as a wing support, the wing beam 8 is positioned so as to serve as a protection for other vital parts of the airplane such as the pilot, the motor 24, wheel assembly 28, air duct 29 and wing machine guns and ammunition boxes 30. As best shown in Figure 1, the muzzles of the wing machine guns 30 and the radiator duct 29 project through the wing beam 8 and open on the leading edge of the wings 6 and 7. Protection is therefore also afforded to this structure.

As disclosed in my co-pending application Serial No. 357,659, filed September 20, 1940, the airplane 1 may be further protected by the use of fuselage bulkheads 31 composed of armor plate which serves as a protection for the machine guns 32, the 37 mm. cannon 33, and the ammunition boxes for these guns 34. The pilot is further protected by a shield of armor plate 35 and a rear bulkhead 36 of armor plate. The space between the shield 35 and bulkhead 36 is enclosed by bullet-proof glass 37. The oil container 40 is of the leak-proof type. The above enumerated improvements, however, do not form a part of the invention claimed in this application.

It is believed apparent from the above discussion that the described wing beam 8 serves a triple function as a wing support, fuel tank, and as a protection for other vital parts of the airplane.

While for purposes of illustration one modification of the invention has been described, it is obvious that the wing beam may be modified for use in different types of airplanes without departing from the basic concept of this invention.

For this reason it is to be understood that the invention disclosed in this application is to be limited only by the prior art and the scope of the appended claims.

I claim:

1. An airplane construction comprising a fuselage having a cockpit, an engine in said fuselage, a wing extending laterally from each side of the fuselage, and a nose box beam at the lead edges of said wings and extending continuously from the outer portion of one wing through the fuselage in front of the cockpit and engine to the outer portion of the other wing, said box beam comprising sheet armor plate shaped to form the nose of both of said wings and extending rearwardly from said nose along the upper and lower surfaces of said wings, and a shear member connecting the upper and lower rear portions of said armor plate, said box beam of armor plate in extending through the fuselage in front of the cockpit and engine serving as armor for the forward portions of said cockpit and engine.

2. An airplane construction comprising a fuselage having a cockpit, an engine in said fuselage, a wing extending laterally from each side of the fuselage, a nose box beam at the lead edges of said wings and extending continuously from the outer portion of one wing through the fuselage in front of the cockpit and engine to the outer portion of the other wing, said box beam comprising sheet armor plate shaped to form the nose of both of said wings and extending rearwardly from said nose along the upper and lower surfaces of said wings, and a shear member connecting the upper and lower rear portions of said armor plate, said box beam of armor plate in extending through the fuselage in front of the cockpit and engine serving as armor for the forward portions of said cockpit and engine, and bulkheads of armor plate positioned at the ends of said nose box beam and closing the interior of said beam to provide an armored receptacle.

3. An airplane construction comprising a fuselage having a cockpit, an engine in said fuselage, a wing extending laterally from each side of the fuselage, a nose box beam at the lead edges of said wings and extending continuously from the outer portion of one wing through the fuselage in front of the cockpit and engine to the outer portion of the other wing, said box beam comprising sheet armor plate shaped to form the nose of both of said wings and extending rearwardly from said nose along the upper and lower surfaces of said wings, a shear member connecting the upper and lower rear portions of said armor plate, said box beam of armor plate in extending through the fuselage in front of the cockpit and engine serving as armor for the forward portions of said cockpit and engine, bulkheads of armor plate positioned at the ends of said nose box beam and closing the interior of said beam to provide an armored receptacle, and apertured bulkheads of lighter weight metal positioned in the beam intermediate its ends to act as surge plates.

4. An airplane construction comprising a fuselage having a cockpit, an engine in said fuselage, a wing extending laterally from each side of the fuselage, a nose box beam at the lead edges of said wings and extending continuously from the outer portion of one wing through the fuselage in front of the cockpit and engine to the outer portion of the other wing, said box beam comprising sheet armor plate shaped to form the nose of both of said wings and extending rearwardly from said nose along the upper and lower surfaces of said wings, a shear member connecting the upper and lower rear portions of said armor plate, said box beam of armor plate in extending through the fuselage in front of the cockpit and engine serving as armor for the forward portions of said cockpit and engine, said armor box beams having openings extending fore and aft therethrough, and machine guns mounted in said wings rearwardly of said armor box beam and projecting through said openings.

5. An airplane construction provided with a fuselage, having a cockpit, a motor installation and a main airfoil supported by a wing beam of box construction which is positioned in front of and horizontally in line with the cockpit and motor installation, said box construction comprising a continuous sheet member shaped to form the nose of the airfoil and extending over a major portion of the length of the beam including the portion in line with the cockpit and motor installation, a shear member joining the rear free ends of the sheet member to form a beam, a bulkhead positioned at and closing each end of the beam, to form a receptacle, said box beam construction being composed of armor metal, and bulkheads of lighter weight metal positioned in the beam intermediate the end bulkheads, said intermediate bulkheads being provided with apertures to act as surge plates.

ROBERT J. WOODS.